UNITED STATES PATENT OFFICE.

ADDISON F. HOFFMAN, OF PITTSBURGH, PENNSYLVANIA.

PROCESS OF MAKING IRON PIGMENT.

1,251,522.      Specification of Letters Patent.      Patented Jan. 1, 1918.

No Drawing.      Application filed April 5, 1916. Serial No. 89,196.

*To all whom it may concern:*

Be it known that I, ADDISON F. HOFFMAN, a citizen of the United States, residing at Pittsburgh, in the county of Allegheny and State of Pennsylvania, have invented new and useful Improvements in Processes of Making Iron Pigment, of which the following is a specification.

Niter cake is the residue remaining after treating sodium nitrate with heat and sulfuric acid in producing commercial nitric acid, and contains considerable quantities of sodium bisulfate. In the making of the nitric acid the following reaction takes place:

$$NaNO_3 + H_2SO_4 = NaHSO_4 + HNO_3$$

Enormous quantities of this chemical are wasted at nitric acid plants and powder plants through lack of knowledge, as to how it can be profitably utilized. Being quite soluble and very frequently thrown on the "dump", it is a source of stream pollution, destroying fish and causing considerable industrial damage.

Niter cake is not strictly of the chemical composition $NaHSO_4$ but contains several per cent. of free sulfuric acid, sodium and potassium bisulfates; a little water, silica, ferric sulfate, normal sodium sulfate; a small quantity of nitric acid, a little undecomposed sodium nitrate; traces of sodium chlorid and iodid and arsenic and $\frac{1}{2}$ to 1% of aluminous matter of clayey nature.

I find that in practice niter cake may be regarded as containing an equivalent of 50 to 60% of anhydrous normal sodium sulfate, and from 30 to 45% of sulfuric acid, of which about 3 to 5% may be free acid and the remainder loosely combined with sulfate of soda, as sodium bisulfate.

The object of this invention is to make use of what was formerly considered a waste and injurious material, and I have found that it can be used in producing useful products, including commercial sulfuric acid, silicate of soda as well as pigment for paints and the like.

I find that if a silicious sand (or a pulverized orthoclase feldspar with, or without sand, used to increase the quantity of alkali) is roasted with niter cake in a suitable furnace at proper temperature, a silicate of soda, or a double silicate of sodium and potassium will be produced. The quantity of sand used with niter cake may generally be from 25 to 100 parts, to 100 parts of niter cake, according to whether the silicate is to be of the composition $Na_2SiO_3$ or $Na_2Si_4O_9$, or between these. If feldspar is used a portion of the silicate may consist of $KNaSi_4O_9$.

The reaction may be illustrated by the following chemical equation, considering only the sodium bisulfate ($NaHSO_4$) which frequently comprises from 92 to 93% of the niter cake;

$$2NaHSO_4 + 4SiO_2 = Na_2Si_4O_9 + H_2SO_4 + SO_3.$$

The sulfuric acid either free or loosely combined is volatilized in the upper part of the furnace, which is preferably of the rotary type, similar to those used in burning cement and lime. The sulfuric acid combined with sodium oxid is liberated by heat and the sand in the lower part of the kiln:

$$2NaHSO_4 = Na_2SO_4 + H_2SO_4$$
$$Na_2SO_4 + 4SiO_2 = Na_2Si_4O_9 + SO_3.$$

A portion of the sulfur trioxid, owing to the high temperature, will be decomposed into sulfur dioxid and oxygen, but owing to the catalytic action of ferric oxid present in the mixture and on the sides of the furnace there will also be some of it recombined, and the draft of the kiln is such that the sulfur trioxid is removed practically as fast as produced from the high heat zone preventing decomposition. The kiln is preferably provided with a pyrometer in order that the temperature may be under complete control.

The gases leaving the kiln are led into an open tank containing water, or preferably to a gas washer, which condenses the sulfuric acid vapors and absorbs the sulfur trioxid, producing sulfuric acid $$SO_3 + H_2O = H_2SO_4.$$

The heat of the gases is dissipated by the evaporation of water. The boiling point of the acid being higher than that of the water, very little acid will be lost in the vapors rising from the tank or washers. It can be seen that the acid, by circulation or control of discharge may under careful management be given considerable concentration in this simple apparatus.

The weak sulfuric acid which is discharged from the condensing apparatus is collected in a tank, from which it is drawn as wanted into tanks, where it is used for pickling iron or steel, producing ferrous sulfate as follows:—

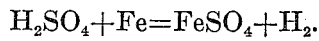

This may in some instances be part of a pickling operation.

The ferrous sulfate solution is next drawn into a settling tank in order to remove any scale or dirt present in the solution.

The clarified ferrous sulfate solution is then mixed with sufficient silicate of soda either as a powder or in solution in a suitable apparatus to cause iron silicate to precipitate in a settling tank, which may be the mixing tank if the silicate is introduced as a liquid. The chemical equation representing this reaction is as follows:

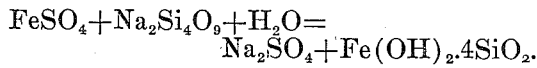

The formula here given, $Fe(OH)_2.4SiO_2$ is given as representing the approximate composition of the precipitate. I do not desire to state that this is one chemical compound. It may be that it consists of a mixture of a ferrous silicate and free silica. It is possible that the material may be a mixture of $FeSiO_3$ and $SiO_2$, but I do not desire to be limited to such an exact mixture, as there are reasons for believing that the actual product contains more than one silicate of iron in admixture with very finely divided silica.

The sulfate of soda can be concentrated by evaporation and crystallization after separation from the precipitate and used along with niter cake in producing silicate of soda where desired. In most cases, however, only a portion would be used for this purpose.

The quantity of silicate of soda produced by sand and niter cake is not sufficient to entirely neutralize the acid which can be produced.

The precipitate $Fe(OH)_2.4SiO_2$ is separated from the sulfate of soda solution by means of a centrifugal separator, or other suitable apparatus.

The precipitate $Fe(OH)_2.4SiO_2$ is allowed to oxidize to $Fe(OH)_3.4SiO_2$, which takes place quickly in moist air. (Here the formula $Fe(OH)_3.4SiO_2$ is to be taken as representing the composition of what is perhaps a mixture and not a chemical compound).

The precipitate is then heated to about 300 degrees C. to drive off the combined water. This produces a product, of which $Fe_2O_3.8SiO_2$ is given as representing the composition of the mass, but not necessarily the fact that it is all one distinct chemical compound. The mixture or whatever it may be, is found to possess properties rendering it especially suitable for use as a pigment, as it is highly resistant, and retains its color for a long period of time.

The resultant calcined precipitate $Fe_2O_3.8SiO_2$ is a pigment especially suitable as an iron paint, containing approximately 25% ferric oxid and 75% silica, and is free from acid or decomposable matter.

It is, of course understood that only enough silica may be used to produce a silicate of the composition $Na_2SiO_3$, or between this and $Na_2Si_4O_9$, which would give a higher percentage of ferric oxid when so desired.

It is also recognized that this process may be used, by means of suitable apparatus, in producing sulfuric acid in a concentrated form for sale, and water glass for the market, without the production of a pigment.

A suitable apparatus for carrying out the above process may consist of a crusher to pulverize niter cake, sand or feldspar; a rotary kiln provided with a condenser, storage and neutralizing tanks and centrifugal separator. The same kiln may be used for both furnace reactions described. The fuel may be gas, oil, or pulverized coal.

What I claim and desire to secure by Letters Patent is;

The herein described process which comprises heating a mixture of niter cake and siliceous material, whereby a soluble silicate is produced and sulfur trioxid and sulfuric acid vapors liberated; treating a solution of ferrous sulfate with said soluble silicate in such proportions that the reacting materials contain about one atom of iron to four atoms of silicon, and sufficient to precipitate at least the major part of the iron content of said solution, separating the precipitate from the liquor and oxidizing the said precipitate, and thereafter calcining the oxidized precipitate at a sufficiently high temperature to effect substantially complete dehydration thereof.

In testimony whereof I affix my signature in presence of two witnesses.

ADDISON F. HOFFMAN.

Witnesses:
B. F. FUNK,
JENNIE JONES.